United States Patent
Kim et al.

(10) Patent No.: US 10,734,158 B2
(45) Date of Patent: Aug. 4, 2020

(54) COIL DEVICE AND APPARATUS INCLUDING THE SAME

(71) Applicant: WITS Co., Ltd., Yongin-si, Gyeonggi-do (KR)

(72) Inventors: Hee Seung Kim, Suwon-si (KR); Tae Sung Kim, Suwon-si (KR); Jae Sun Won, Suwon-si (KR); Jae Suk Sung, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 695 days.

(21) Appl. No.: 15/298,587

(22) Filed: Oct. 20, 2016

(65) Prior Publication Data

US 2017/0178803 A1    Jun. 22, 2017

(30) Foreign Application Priority Data

Dec. 17, 2015  (KR) .......................... 10-2015-0181288
Feb. 3, 2016   (KR) .......................... 10-2016-0013578

(51) Int. Cl.
| | |
|---|---|
| *H01F 5/00* | (2006.01) |
| *H01F 38/14* | (2006.01) |
| *H02J 50/10* | (2016.01) |
| *H01F 27/245* | (2006.01) |
| *H01F 27/28* | (2006.01) |
| *H02J 7/02* | (2016.01) |
| *H01F 3/00* | (2006.01) |

(52) U.S. Cl.
CPC ............... *H01F 38/14* (2013.01); *H01F 5/00* (2013.01); *H01F 27/245* (2013.01); *H01F 27/2804* (2013.01); *H02J 7/025* (2013.01); *H02J 50/10* (2016.02); *H01F 2003/005* (2013.01); *H01F 2027/2809* (2013.01); *H01F 2038/143* (2013.01)

(58) Field of Classification Search
CPC .......................... H01F 5/00; H01F 27/00–36
USPC .... 336/65, 83, 170–175, 180–184, 213–215, 336/200, 232
See application file for complete search history.

(56) References Cited

U.S. PATENT DOCUMENTS 9,318,258 B2 *  4/2016  Yamakawa ............. H01F 38/14
9,716,390 B2 *  7/2017  Chiyo ..................... H01F 27/38
(Continued)

FOREIGN PATENT DOCUMENTS

| | | |
|---|---|---|
| CN | 103748765 A | 4/2014 |
| CN | 104681257 A | 6/2015 |
| CN | 104704676 A | 6/2015 |

(Continued)

OTHER PUBLICATIONS

Chinese Office Action dated Oct. 9, 2019 issued in corresponding Chinese Application No. 201610974653.9.

(Continued)

*Primary Examiner* — Tuyen T Nguyen
(74) *Attorney, Agent, or Firm* — Harness, Dickey & Pierce, P.L.C.

(57) ABSTRACT

There are provided a coil device and an apparatus including the same. The coil device includes a first coil and a second coil. The first coil is configured to receive a first signal using a first magnetic field formed in a first direction. The second coil includes a shape different from the first coil and is configured to form a second magnetic field in a second direction, different from the first direction, to transmit a second signal, different from the first signal.

9 Claims, 6 Drawing Sheets

(56) References Cited

U.S. PATENT DOCUMENTS 9,728,325 B2 * 8/2017 Chiyo .................. H01F 27/38
2015/0145343 A1   5/2015 Chiyo et al.

FOREIGN PATENT DOCUMENTS

| JP | 2014-64267 A | 4/2014 |
| JP | 2015-106939 A | 6/2015 |
| WO | WO-2012/067522 A1 | 5/2012 |

OTHER PUBLICATIONS

Chinese Office Action dated May 6, 2020 issued in corresponding Chinese Patent Application No. 201610974653.9.

* cited by examiner

COIL DEVICE AND APPARATUS INCLUDING THE SAME

CROSS-REFERENCE TO RELATED APPLICATION(S)

This application claims benefit under 35 USC 119(a) of priority to Korean Patent Application Nos. 10-2015-0181288 filed on Dec. 17, 2015 and 10-2016-0013578 filed on Feb. 3, 2016 in the Korean Intellectual Property Office, the disclosure of which is incorporated herein by reference in its entirety.

BACKGROUND

1. Field

The following description relates to a coil device including a plurality of coils, and an apparatus including the same.

2. Description of Related Art

A technology for transmitting or receiving signals (for example, data or power signals) using the characteristics of a coil into which a current or a voltage is induced depending on a change in a magnetic field, has been applied to various fields. For instance, when a transmitter generates a change in a magnetic field, a current or a voltage is induced into a coil included in a receiver, and the receiver uses the current or the voltage as power for an internal apparatus or reads transmitted information using the current or the voltage. However, recently, a case in which a single apparatus includes a plurality of coils in order to transmit and/or receive signals using a plurality of different standards or schemes in the single apparatus has increased. In addition, in the case in which the single apparatus includes the plurality of coils, the plurality of coils utilizes magnetic fields formed in different directions, thus, making it difficult to efficiently use the power or read the transmitted information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, a coil device is described configured to form magnetic fields in different directions or receive signals from magnetic fields formed in different directions.

In accordance with an embodiment, there is provided a coil device, including: a first coil configured to receive a first signal using a first magnetic field formed in a first direction; and a second coil including a shape different from the first coil and configured to form a second magnetic field in a second direction, different from the first direction, to transmit a second signal, different from the first signal.

The first coil may include a spiral shape and the second coil may include a solenoid shape.

The first signal may be a power signal that may be wirelessly transmitted, and the second signal may be a communications signal transmitted in a magnetic secure transmission (MST) scheme.

A direction of the first magnetic field, at a center of the first coil, may be the first direction, and a direction of the second magnetic field, in a region above the center of the first coil, may be the second direction, and the first direction may be a direction normal to a plane on which the first coil may be disposed, and the second direction may be a direction orthogonal to the first direction.

The first coil and the second coil are stacked, and the second coil includes a first region disposed on one side of the first coil, a second region formed on another side of the first coil so as to be spaced apart from the first region, and a third region connecting the first region and the second region to each other.

The coil device may further include a first substrate, a magnetic sheet, and a second substrate that are sequentially stacked, wherein the first coil may be formed on one surface of the first substrate and another surface of the first substrate, the second coil may be formed on the other surface of the first substrate and one surface of the second substrate, and the magnetic sheet may be a core of the second coil.

The first coil may include: a coil pattern part formed on the one surface of the first substrate and having a spiral shape, a first connection pattern part formed on the one surface of the first substrate and connected to an outer distal end of the coil pattern part, and a second connection pattern part formed on the other surface of the first substrate and connected to an inner distal end of the coil pattern part through a via formed in the first substrate.

The second coil may include: first patterns formed on the other surface of the first substrate, and second patterns formed on the one surface of the second substrate, wherein both distal ends of each of the first patterns may be connected to both distal ends of each of the second patterns.

Each of the first patterns may include a portion having the same shape as that of the coil pattern part.

In accordance with another embodiment, there is provided an apparatus, including: a coil device including a first coil configured to receive a first signal using a first magnetic field formed in a first direction, and a second coil including a shape different from the first coil and configured to form a second magnetic field in a second direction, different from the first direction, to transmit a second signal, different from the first signal; a first module connected to the first coil; and a second module connected to the second coil.

The first signal may be a power signal that may be wirelessly transmitted, and the second signal may be a communications signal transmitted in a magnetic secure transmission (MST) scheme, the first module may convert the first signal into a charging power and outputs the charging power, and the second module may output an information signal to the second coil in order to transmit encrypted credit card information as the second signal.

A direction of the first magnetic field at a center of the first coil may be the first direction, and a direction of the second magnetic field in a region above the center of the first coil may be the second direction, and the first direction may be a direction normal to a plane on which the first coil may be disposed, and the second direction may be a direction orthogonal to the first direction.

The first coil and the second coil may be stacked, and the second coil may include a first region disposed on one side of the first coil, a second region formed on another side of the first coil so as to be spaced apart from the first region, and a third region connecting the first region and the second region to each other.

The coil device further may include a first substrate, a magnetic sheet, and a second substrate that are sequentially stacked, wherein the first coil may be formed on one surface of the first substrate and another surface of the first substrate, the second coil may be formed using the other surface of the first substrate and one surface of the second substrate, and the magnetic sheet may be a core of the second coil.

The first coil may include: a coil pattern part formed on the one surface of the first substrate and having a spiral shape, a first connection pattern part formed on the one surface of the first substrate and connecting an outer distal end of the coil pattern part and the first module to each other, and a second connection pattern part formed on the other surface of the first substrate and connecting an inner distal end of the coil pattern part and the first module to each other through a via formed in the first substrate.

The second coil may include: first patterns formed on the other surface of the first substrate, and second patterns formed on the one surface of the second substrate, and wherein both distal ends of each of the first patterns may be connected to both distal ends of each of the second patterns, respectively, and one end of a first pattern may be disposed at an outermost portion among the first patterns and one end of a second pattern disposed at an outermost portion among the second patterns are connected to the second module.

Each of the first patterns may include a portion having the same shape as that of the coil pattern part.

In accordance with a further embodiment, there is provided an apparatus, including: a coil device configured to receive or transmit a first signal using a change in a first magnetic field formed in a first direction at a first coil, and configured to transmit or receive a second signal using a second magnetic field formed in a second direction, orthogonal to the first direction, at a second coil; and a first module configured to rectify the first signal, convert the rectified first signal into charging power, and output the charging power through the first coil.

The apparatus may also include a second module configured to output an information signal to the second coil for transmission or reception of the second signal and extract transmitted information through the second signal.

The apparatus may also include a second module configured to apply a voltage pulse or current pulse across the second coil to generate a change in the second magnetic field to enable a reader to sense an approaching mobile device.

The first coil may be formed on a surface of a double-sided first substrate and the second coil may be formed on a surface of a single-sided second substrate, and wherein the first coil may include a coil pattern part having a spiral shape, a first connection pattern may connect an outer distal end of the coil pattern part to the first module, and a second connection pattern may connect an inner distal end of the coil pattern part to the first module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
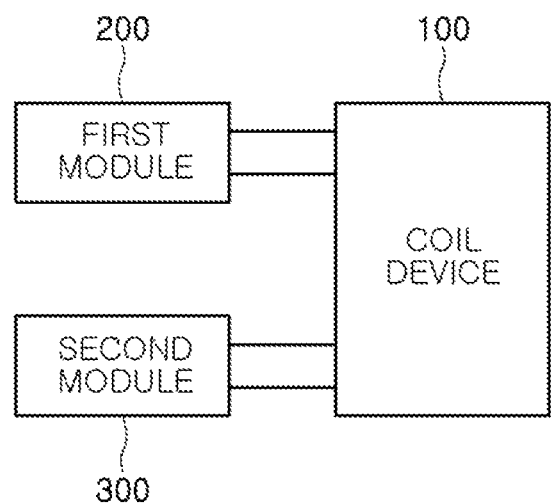
FIG. 1 is a block diagram schematically illustrating an apparatus including a coil device, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. in the art.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The contents of the present disclosure described below may have a variety of configurations and propose only a required configuration herein, but are not limited thereto.

FIG. 1 is a block diagram schematically illustrating an apparatus including a coil device, according to an embodiment. The apparatus including the coil device includes the coil device 100, a first module 200, and a second module 300.

The coil device 100 receives a first signal transmitted in a scheme in which a magnetic field formed in a first direction changes or the coil device 100 changes the magnetic field to be formed in the first direction in order to transmit the first signal in the first direction. The coil device 100 receives a second signal transmitted in a scheme in which a magnetic field formed in a second direction, different from the first direction, changes or the coil device 100 changes the magnetic field to be formed in the second direction in order to transmit the second signal. To this end, the coil device 100 includes a first coil transmitting or receiving the first signal and a second coil transmitting or receiving the second signal. As shown in FIGS. 4 through 11, the first and the second coils are part of the coil device 100.

Figure 2:
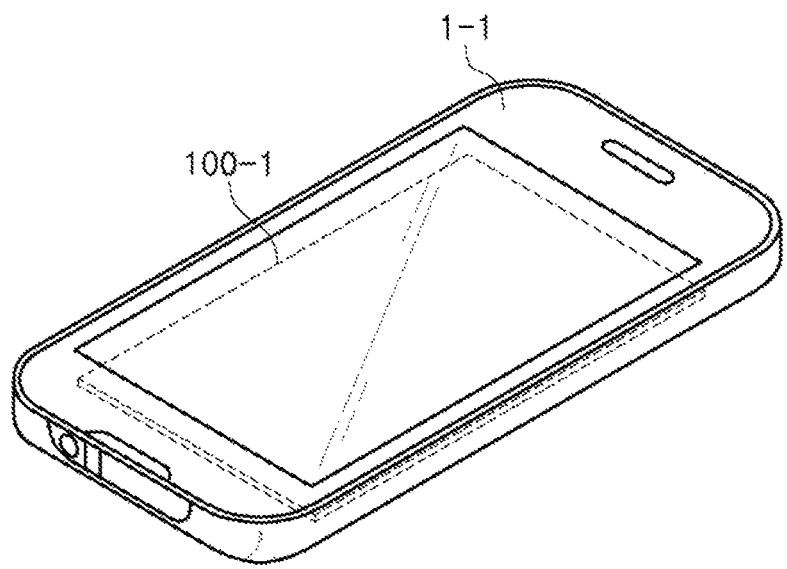
FIGS. 2 and 3 are views schematically illustrating apparatuses including a coil device, according to an embodiment.
Figure 3:
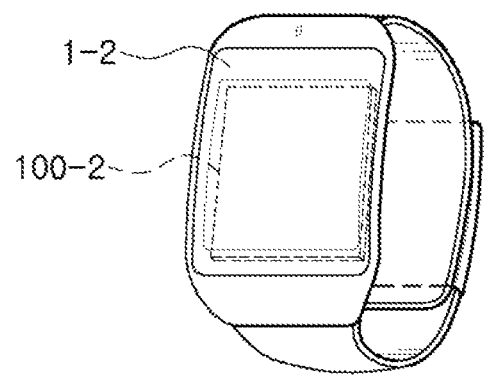

In an embodiment, the coil device 100 transmits or receives the first signal using the change in the magnetic field formed in the first direction at the center of a first coil. In one example, the first signal is power that is wirelessly transmitted or wirelessly received. That is, in a case in which the coil device 100 is a mobile device, as illustrated in FIG. 2 or FIG. 3, the first signal is a power signal wirelessly transmitted from an external wireless power transmitting device to be used in the mobile device. As a non-exhaustive example only, the coil device 100 as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard The second coil transmits or receives the second signal using the magnetic field formed in the second direction, different from the first direction, at the center of the second coil. The first direction and the second direction may be orthogonal to each other. In addition, the second signal may be a communications signal transmitted in a magnetic secure transmission (MST) scheme, for example, a signal to transmit encrypted credit card information. For example, in an example in which the coil device is the mobile device, or is the wearable device as described above and as illustrated in FIG. 2 or FIG. 3, the second signal is a signal for transmitting credit card information for mobile payment in the MST scheme.

The first module 200 is coupled to the first coil to transmit the first signal or receive the first signal. As described above, in an example, the first signal is power that is wirelessly transmitted or wirelessly received. In an example in which the coil device is the mobile device or is the wearable device such, as illustrated in FIG. 2 or FIG. 3, the first module 200 rectifies the first signal, converts the rectified first signal into charging power, and outputs the charging power. The charging power is supplied to each component of the apparatus or is used to charge a battery of the apparatus. In some cases, the first module 200 transmits information of an amount of charging power required to the wireless power transmitting device through the first coil.

The second module 300 is coupled to the second coil to output an information signal to the second coil in order to transmit the second signal or receive the second signal and extract transmitted information through the second signal. As described above, the second signal may be the communications signal to transmit the encrypted credit card information. In an example in which the coil device is the mobile device or is the wearable device, as illustrated in FIG. 2 or FIG. 3, the second module 300 applies a predetermined voltage pulse or a predetermined current pulse across the second coil to sufficient to generate a change in a magnetic field around the second coil so that a general magnetic card reader may sense an approaching mobile device.

FIGS. 2 and 3 are views schematically illustrating apparatuses including a coil device, according to an embodiment.

Referring to FIG. 2, an apparatus 1-1 may be a smartphone including a coil device 100-1. Alternatively, referring to FIG. 3, an apparatus 1-2 may be a smartwatch including a coil device 100-2.

Although the smartphone and the smartwatch have been illustrated in FIGS. 2 and 3, respectively, the apparatus may be various mobile apparatuses or electronic apparatuses.

In a case in which the apparatus of FIG. 2 or FIG. 3 is positioned on a wireless power transmitting device, a magnetic field may generally be formed in a direction normal to one surface (for example, an upper surface) of the wireless power transmitting device. As a result, a change in the magnetic field formed in the direction normal to one surface of the apparatus of FIG. 2 or FIG. 3 is created. Therefore, the apparatus of FIG. 2 or FIG. 3 charges power in an internal battery or supplies power to other internal devices using the first coil and the first module.

In a case of attempting mobile payment using the apparatus of FIG. 2 or FIG. 3, the apparatus may be positioned in the vicinity of the magnetic card reader. In this case, a magnetic field is formed in a length or a longitudinal direction of the apparatus of FIG. 2 or FIG. 3 by the second module and the second coil, and a shadow zone of the magnetic field is not present when being viewed on one surface of the apparatus. Therefore, the magnetic card reader reads credit card information from the magnetic field formed by the apparatus of FIG. 2 or FIG. 3 regardless of a position of the apparatus of FIG. 2 or FIG. 3.

Figure 4:
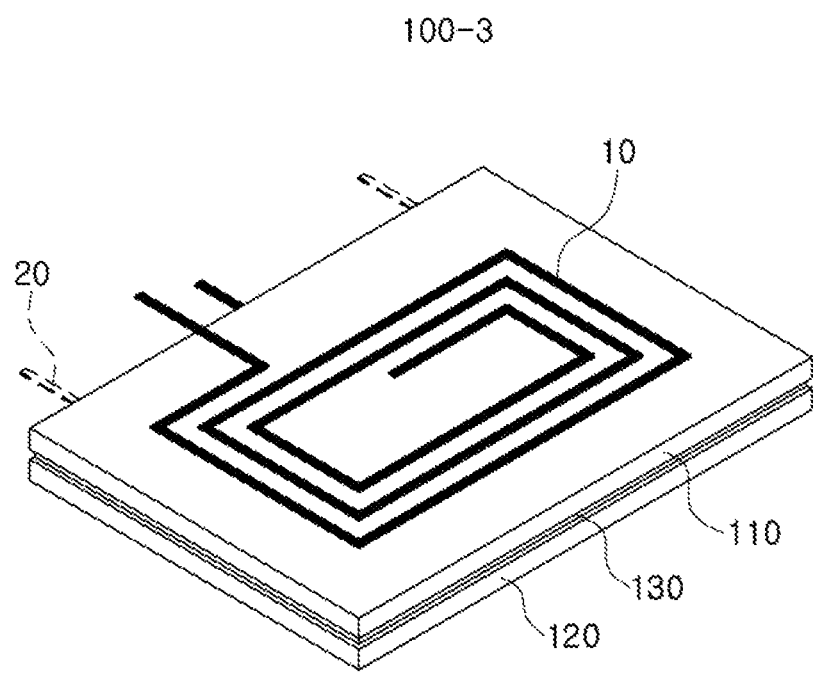
FIG. 4 is a perspective view schematically illustrating a coil device, according to an embodiment.

FIG. 4 is a perspective view schematically illustrating a coil device, according to an embodiment. A coil device 100-3, according to an embodiment, includes a first substrate 110, a second substrate 120, a magnetic sheet 130, a first coil 10, and a second coil 20.

The first substrate 110 is a doubled-sided substrate, and the first coil 10 is formed on one surface (for example, an upper surface) of the first substrate 110. The first coil 10 includes a coil pattern part having a spiral shape, a first connection pattern connecting an outer distal end of the coil pattern part to the first module 200 (see FIG. 1), and a second connection pattern connecting an inner distal end of the coil pattern part to the first module 200 (see FIG. 1). All of the coil pattern part, the first connection pattern, and the second connection pattern may be electrically connected to each other. In one embodiment, the coil pattern part and the first connection pattern of the first coil may be formed on one surface (for example, the upper surface) of the first substrate 110. Although the coil pattern part is described as having a spiral shape, the coil pattern part may include other types of shapes to produce a magnetic field.

The second connection pattern of the first coil and some of patterns of the second coil 20 is formed on another surface (for example, a rear surface) of the first substrate 110.

The second substrate 120 is a single-sided substrate, and some of patterns of the second coil 20 are formed on one surface of the second substrate 120.

The magnetic sheet 130 collects a magnetic field received by the first coil 10, shields the magnetic field to prevent other circuit portions in the apparatus from being affected by the magnetic field, and serves as a core of the second coil 20.

Then, distal ends of the first substrate 110 and the second substrate 120 are bonded to each other using a method such as hot bar soldering, laser fusing, ultrasonic wave fusing, or other similar methods. For example, the distal ends of the first substrate 110 and the second substrate 120 are bonded to each other so that distal ends of respective patterns of the second coil 20 formed on another surface (for example, the rear surface) of the first substrate 110 and distal ends of the respective patterns of the second coil 20 formed on one surface (for example, an upper surface) of the second substrate 120 contact each other.

Figure 5:
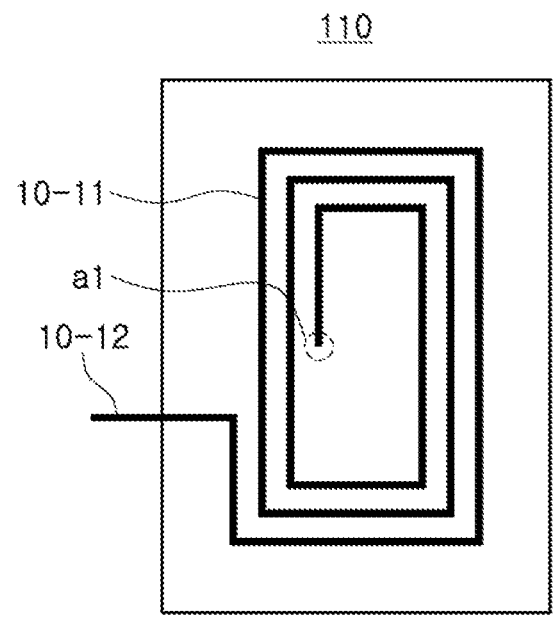
FIG. 5 is a view schematically illustrating a surface of a first substrate of the coil device, according to an embodiment illustrated in FIG. 4.
Figure 6:
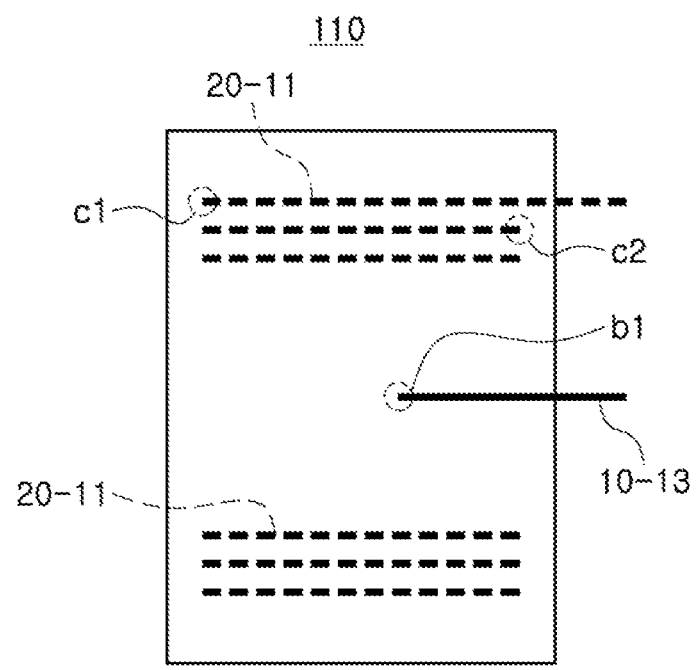
FIG. 6 is a view schematically illustrating another surface of the first substrate of the coil device, according to an embodiment illustrated in FIG. 4.
Figure 7:
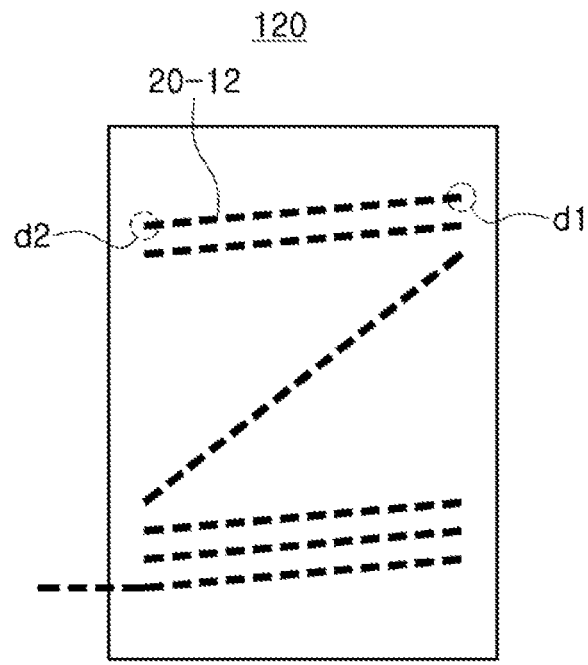
FIG. 7 is a view schematically illustrating a surface of a second substrate of the coil device, according to an embodiment illustrated in FIG. 4.

FIG. 5 is a view schematically illustrating a surface, for example, an upper surface, of a first substrate 110 of the coil device, according to an embodiment, illustrated in FIG. FIG. 6 is a view schematically illustrating another surface (for example, a rear surface) of the first substrate 110 of the coil device, according to an embodiment illustrated in FIG. 4. FIG. 7 is a view schematically illustrating one surface (for example, an upper surface) of a second substrate 120 of the coil device, according to an embodiment illustrated in FIG. 4.

As illustrated in FIGS. 4 through 7, in one example, the first coil 10 is a spiral coil having a quadrangular shape. In addition, the first coil 10 includes a coil pattern part 10-11 having a spiral shape, a first connection pattern 10-12 connecting an outer distal end of the coil pattern part to the first module 200 (see FIG. 1), and a second connection pattern 10-13 connecting an inner distal end of the coil pattern part to the first module 200 (see FIG. 1). In addition, the second coil 20 may be a coil having a solenoid shape.

As illustrated in FIG. 5, the coil pattern part 10-11 of the first coil 10 (see FIG. 4) and the first connection pattern 10-12 connected to the outer distal end of the coil pattern part 10-11 and connecting the first coil 10 (see FIG. 4) and the first module 200 (see FIG. 1) to each other are formed on one surface (for example, the upper surface) of the first substrate 110.

As illustrated in FIG. 6, the second connection pattern 10-13 connects an inner distal end a1 of the coil pattern part 10-11 formed on one surface (for example, the upper surface) of the first substrate 110 illustrated in FIG. 5 to the first module 200 (see FIG. 1). The second coil 20 (see FIG. 4) includes some patterns 20-11 that are formed on another surface (for example, the rear surface) of the first substrate 110. The inner distal end a1 of the coil pattern part 10-11 formed on one surface (for example, the upper surface) of the first substrate 110 and a distal end b1 of the second connection pattern 10-13 formed on another surface (for example, the rear surface) of the first substrate 110 are connected to each other through a via formed in the first substrate 110. As illustrated in FIG. 6, some of the patterns 20-11 20-11 of the second coil 20 (see FIG. 4) are formed at only portions, excluding a central portion of the coil pattern part 10-11. In addition, some of the patterns 20-11 of the second coil 20 (see FIG. 4) extend up to the outside or exterior of the magnetic sheet 130 (see FIG. 4), which is disposed between the first substrate 110 and the second substrate 120. That is, respective distal ends c1 and c2 of some of the patterns 20-11 of the second coil 20 (see FIG. 4) are positioned in a region in which the magnetic sheet 130 (see FIG. 4) is not disposed or is excluded at edges of the first substrate 110. In other words, a width of the magnetic sheet 130 (see FIG. 4) is smaller than a length of each of some of the patterns 20-11 of the second coil 20 (see FIG. 4).

As illustrated in FIG. 7, some 20-12 of patterns of the second coil 20 (see FIG. 4) are formed on one surface (for example, the upper surface) of the second substrate 120. The respective distal ends c1 and c2 of some of the patterns 20-11 of the second coil 20 (see FIG. 4) formed on another surface (for example, the rear surface) of the first substrate 110 are connected to respective distal ends d1 and d2 of some of the patterns 20-12 of the second coil 20 (see FIG. 4) formed on one surface (for example, the upper surface) of the second substrate 120, respectively. For example, the distal end of the first substrate 110 and the distal end of the second substrate 120 adhere to each other, such that the respective distal ends c1 and c2 (see FIG. 6) of some 20-11

(see FIG. 6) of the patterns of the second coil 20 are connected to the respective distal ends d1 and d2 (see FIG. 7) of some (see FIG. 7) of the patterns 20-12 of the second coil 20 (see FIG. 4) formed on one surface (for example, the upper surface) of the second substrate 120, respectively. Alternatively, separate conducting wires, vias, or connectors, connecting the respective distal ends c1 and c2 (see FIG. 6) and the respective distal ends d1 and d2 (see FIG. 7) may also be included.

Figure 8:
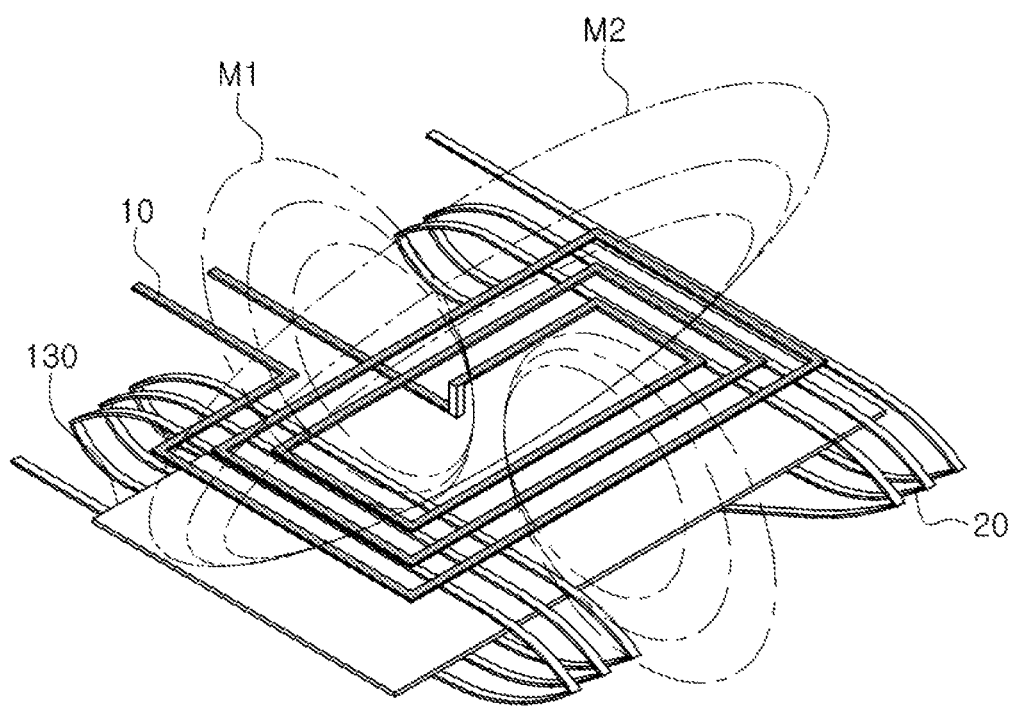
FIG. 8 is a view schematically illustrating a coil portion of the coil device, according to an embodiment illustrated in FIG. 3.

FIG. 8 is a view schematically illustrating a coil portion of the coil device, according to an embodiment illustrated in FIG. 3. In FIG. 8, a reference sign M1 refers to a line of magnetic force of a first magnetic field, and a reference sign M2 refers to a line of magnetic force of a second magnetic field.

The first coil 10 may be formed using one surface (for example, the upper surface) and another surface (for example, the rear surface) of the first substrate 110 (see FIGS. 5 and 6). As illustrated in FIG. 8, the first coil 10 may have a spiral coil shape.

The second coil 20 is formed using another surface (for example, the rear surface) of the first substrate 110 (see FIG. 6) and one surface (for example, the upper surface) of the second substrate 120 (see FIG. 7), and the magnetic sheet 130 serves as a core of the second coil 20. As illustrated in FIG. 8, the second coil 20 may have a solenoid coil shape.

The first coil 10 forms a first magnetic field M1 in a first direction to transmit a signal or receive a signal transmitted using the first magnetic field M1. For example, the first direction is a direction normal to one surface (for example, the upper surface) of the first substrate. In addition, the first direction is a direction of the first magnetic field M1 at the center of the first coil 10.

The second coil 20 forms a second magnetic field M2 in a second direction, different from the first direction, to transmit a signal or receive a signal transmitted using the second magnetic field M2. For example, the second direction, orthogonal to the first direction, is a length or longitudinal direction of one surface (for example, the upper surface) of the first substrate or one surface (for example, the upper surface) of the second substrate. In addition, the second direction is a direction of the second magnetic field M2 in a region above the center of the second coil 20. In addition, a center of the second coil 20 is substantially the same as that of the first coil 10. Therefore, the second direction is a direction of the second magnetic field M2 in a region above the center of the first coil 10.

In addition, as illustrated in FIG. 8, the second coil 20 is formed in a region excluding a central portion of the first coil 10. That is, the second coil 20 includes a first region formed at one side of the first coil 10, a second region formed on another side of the first coil 10 so as to be spaced apart from the first region, and a third region connecting the first region and the second region to each other. For example, as illustrated in FIGS. 6 through 8, the first region of the second coil 20 includes patterns disposed at one side (an upper portion of FIG. 6) of the other surface of the first substrate 110 among some of the patterns 20-11 (see FIG. 6) and patterns disposed at one side (an upper portion of FIG. 7) of one surface of the second substrate 120 among some of the patterns 20-12 (see FIG. 7). The second region of the second coil 20 includes patterns disposed on another side (a lower portion of FIG. 6) of the other surface of the first substrate 110 among some of the patterns 20-11 (see FIG. 6) and patterns disposed on another side (a lower portion of FIG. 7) of one surface of the second substrate 120 among some of the patterns 20-12 (see FIG. 7). The third region of the second coil 20 includes patterns disposed at a central portion (a central portion of FIG. 7) of one surface of the second substrate 120 among some of the patterns 20-12 (see FIG. 7).

Figure 9:
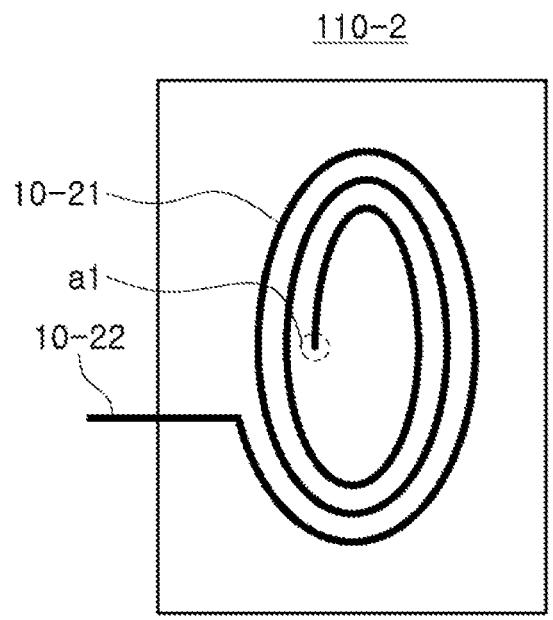
FIG. 9 is a view schematically illustrating a surface of the first substrate of the coil device, according to an embodiment.
Figure 10:
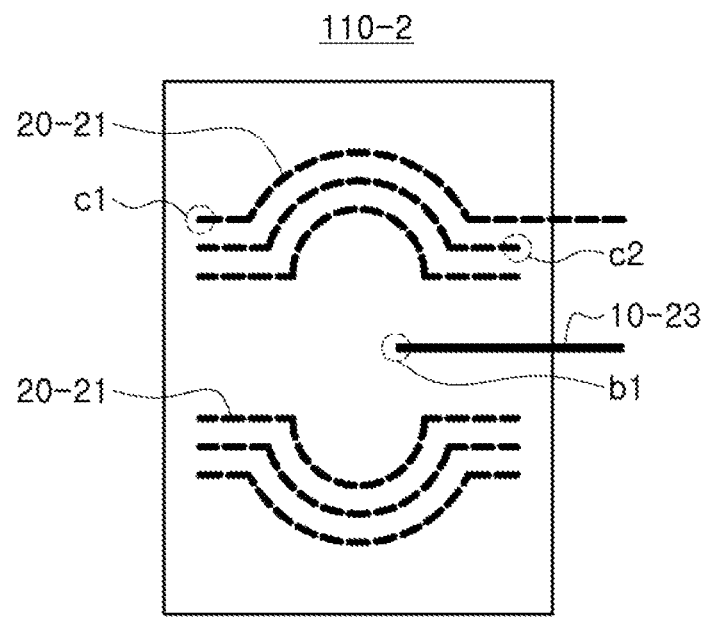
FIG. 10 is a view schematically illustrating another surface of the first substrate of the coil device, according to an embodiment.
Figure 11:
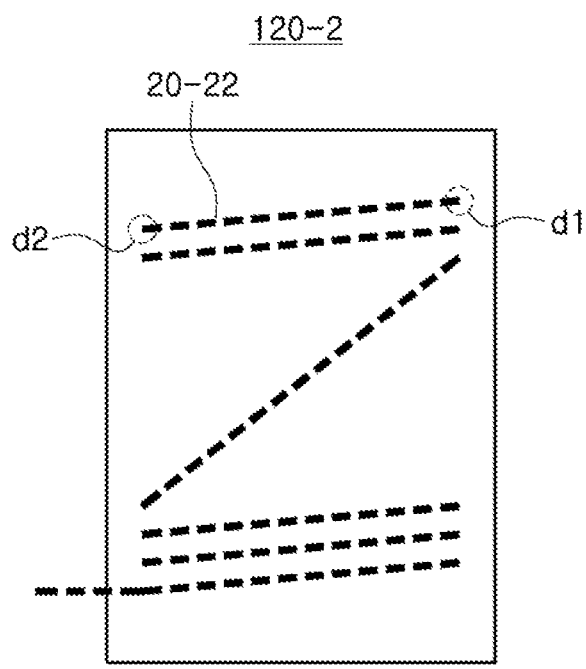
FIG. 11 is a view schematically illustrating one surface (for example, an upper surface) of the second substrate of the coil device, according to an embodiment.

FIG. 9 is a view schematically illustrating one surface (for example, an upper surface) of the first substrate of the coil device, according to an embodiment. FIG. 10 is a view schematically illustrating another surface (for example, a rear surface) of the first substrate of the coil device, according to an embodiment. FIG. 11 is a view schematically illustrating one surface (for example, an upper surface) of the second substrate of the coil device, according to an embodiment.

The coil device illustrated in FIGS. 9 through 11 is the same as the coil device illustrated in FIGS. 5 through 7, except that a first coil is a circular spiral coil. Therefore, the coil device illustrated in FIGS. 9 through 11 may be easily understood with reference to the description of FIGS. 5 through 7.

As illustrated in FIG. 10, some of the patterns 20-21 of the second coil have a circular shape. A resistance value of the second coil is determined depending on a length of the patterns having the circular shape. That is, the second coil may have a desired resistance value by adjusting a length of a curved portion of the second coil. This may be similarly applied to the embodiments of FIGS. 5 through 7. In addition, a resistance value of the second coil may be adjusted by adjusting a line width of the second coil.

Although a case in which the first coil is the circular spiral coil has been illustrated in FIGS. 9 through 11, the first coil may have various shapes. In addition, some of the patterns of the second coil may have the same shape as some of the patterns of the first coil.

As set forth above, in the coil device and the apparatus including the same, according to an embodiment, power consumed at the time of transmitting information may be reduced.

The first and the second modules and coil device in FIG. 1 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil device, comprising:
    a first coil configured to receive a first signal using a first magnetic field formed in a first direction; and
    a second coil comprising a shape different from the first coil and configured to form a second magnetic field in a second direction to transmit a second signal, the second direction being different from the first direction, the second signal being different from the first signal,
    wherein the second coil includes a first region on one side of the first coil, a second region on another side of the first coil so as to be spaced apart from the first region, and a third region connecting the first region and the second region to each other, and
    wherein a number of lines of the third region is less than a number of turns of each of the first region and the second region.

2. The coil device of claim 1, wherein the first coil comprises a spiral shape and the second coil comprises a solenoid shape.

3. The coil device of claim 1, wherein the first signal is a power signal that is wirelessly transmitted, and the second signal is a communications signal transmitted in a magnetic secure transmission (MST) scheme.

4. The coil device of claim 1, wherein a direction of the first magnetic field, at a center of the first coil, is the first direction, and a direction of the second magnetic field, in a region above the center of the first coil, is the second direction, and
    the first direction is a direction normal to a plane on which the first coil is disposed, and the second direction is a direction orthogonal to the first direction.

5. The coil device of claim 1, wherein the first coil and the second coil are stacked.

6. The coil device of claim 1, further comprising:
    a first substrate, a magnetic sheet, and a second substrate that are sequentially stacked,
    wherein the first coil is on one surface of the first substrate and another surface of the first substrate, the second coil is on the another surface of the first substrate and one surface of the second substrate, and the magnetic sheet is a core of the second coil.

7. The coil device of claim 6, wherein the first coil comprises:
    a coil pattern part on the one surface of the first substrate and having a spiral shape,
    a first connection pattern part on the one surface of the first substrate and connected to an outer distal end of the coil pattern part, and
    a second connection pattern part on the another surface of the first substrate and connected to an inner distal end of the coil pattern part through a via in the first substrate.

8. The coil device of claim 7, wherein
    the second coil comprises,
        first patterns on the another surface of the first substrate, and
        second patterns on the one surface of the second substrate, and
    both distal ends of each of the first patterns are connected to both distal ends of each of the second patterns.

9. The coil device of claim 8, wherein each of the first patterns comprises a portion having the same shape as that of the coil pattern part.

* * * * *